I. A. DUNHAM.
Edge-Plane for Boots and Shoes.
No. 224,769. Patented Feb. 24, 1880.
Fig: 2. 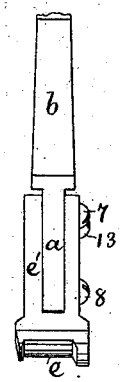
Fig: 1. 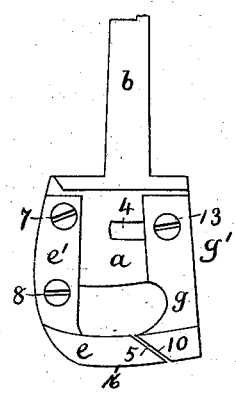
Fig: 3. 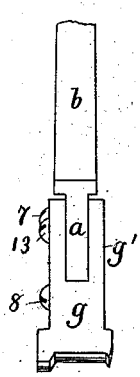
Fig: 4. 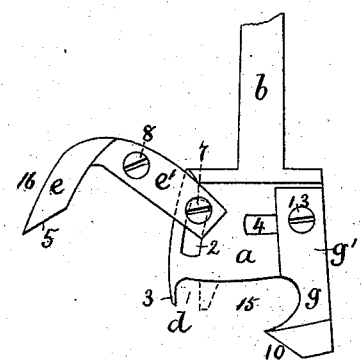
Fig: 5. 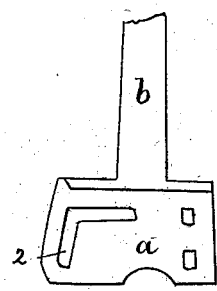
Witnesses.
Jos. P. Livermore
L. F. Connor
Inventor.
Isaac A. Dunham
by Crosby & Gregory
Attys

UNITED STATES PATENT OFFICE.

ISAAC A. DUNHAM, OF BROCKTON, MASSACHUSETTS.

EDGE-PLANE FOR BOOTS AND SHOES.

SPECIFICATION forming part of Letters Patent No. 224,769, dated February 24, 1880.

Application filed December 20, 1879.

*To all whom it may concern:*

Be it known that I, ISAAC A. DUNHAM, of Brockton, county of Plymouth, State of Massachusetts, have invented an Improvement in Edge-Planes, of which the following description, in connection with the accompanying drawings, is a specification.

This invention relates to an edge-plane for boots and shoes, and has for its object the production of a simple, strong, cheap, and efficient device for cutting and molding boot and shoe edges.

Figure 1 represents, in side elevation, an edge-plane containing my invention; Fig. 2, a view of Fig. 1, looking at it from the right; Fig. 3, a view looking at it from the left; Fig. 4, a side view, showing the cutter turned back, as it may be, to be ground; and Fig. 5 is a modification, wherein the direction of the slots in the head is reversed.

The stock or head $a$, having a tongue, $b$, to enter a suitable handle of usual construction, has an inclosed vertical slot, 2, and one or more projections, 3, to form a holding-recess, $d$, and also a horizontal slot, 4.

The cutter $e$, properly grooved, of suitable cross-section, (see Fig. 2,) and adapted to be sharpened by grinding away its face 5, has its upwardly-extended shank $e'$ slotted or bifurcated, as at Fig. 2, to embrace the stock $a$, the cutter being adjustably held in place upon the said head by means of the screws 7 8.

The screw 7 is extended through the slot 2, and enters the opposite member of the bifurcated shank $e'$. The screw 8 also enters the opposite member of the said shank $e'$.

The screw 8, when the cutter is in operative position, as in Fig. 1, rests at the right of projection 3; or it may be between projection 3 and a second like projection formed near it, as shown in dotted lines, Fig. 4, the two projections, if used, forming an open notch, $d$.

The strain on the cutter exerts a tendency to turn it about its pivot-screw 7; but the screw 8, resting against the right-hand side of the projection 3, prevents such motion.

The slot 2 permits the cutter to be adjusted vertically, as may be desired, to keep the proper space between its face 5 and the face 10 of the guard $g$.

To grind the cutter it is not necessary to remove either of the screws 7 8, for they act upon the bifurcated shank $e'$ to clamp it more or less tight against the head $a$, and by loosening the screw 8, or it and screw 7, if desired, the cutter may be moved longitudinally, the screw 7 traveling in slot 2, and the cutter may be turned outward, as in Fig. 4, in which position its face 5 or the face 10 of the guard may be readily ground.

The guard $g$ has its shank $g'$ bifurcated, as shown in Fig. 3, to embrace the head $a$ and be clamped thereto, as described of the cutter, by the screw 13, which is extended through the horizontal slot 4 of the head $a$, the said guard being adjustable, as herein shown in Figs. 1 and 4, horizontally, as such adjustment of it, while the cutter is adjustable vertically, affords provision for all the needed adjustments for practical use.

In edge-planes wherein the cutters have to be removed from the heads to be ground, much time is lost in removing and inserting the screws.

It is necessary to loosen screws 7 and 8 but a very little to be able to move the cutter backward.

I do not broadly claim a head with an adjustable cutter mounted thereon, nor a head with an adjustable guard; but I am not aware of any edge-plane wherein the cutter and guard have been held upon the head as herein described.

In this my construction the head does not become worn, and a new cutter or guard may be applied to it whenever necessary, thereby saving the cost of the head.

It is obvious that I may modify my invention, as indicated in Fig. 5, wherein the slots are made the reverse of those shown, to enable the cutter to be adjusted longitudinally and the guard vertically.

The edge 15 of the head $a$ and the slot 4 are curved, it will be noticed, to correspond substantially with the curvature of the molded or grooved face 16 of the cutter, to thereby permit the guard $g$, as it is worn away and adjusted, to always retain its acting-face at the same curvature with relation to the cutter.

I claim—

1. In an edge-plane, the head $a$, having a slot, 2, and a projection, 3, combined with a cutter having a bifurcated shank, adapted to be held thereon by a screw or screws, which clamp the cutter to the head, substantially as described.

2. The head a, provided with a slot, 4, combined with the guard g, having a bifurcated shank adapted to be held to the head by a clamping-screw, to permit the guard to be adjusted on the head, substantially as described.

3. As an improved article of manufacture, an edge-plane consisting of the head a, slotted at 2 4, and provided with a projection, 3, a cutter having a bifurcated shank, and held to the head by a clamping screw or screws, so as to be turned outward for grinding without removing the said screw or screws from the cutter, and a detachable guard, g, substantially as described.

In testimony whereof I have signed my name to this specification in the presence of two subscribing witnesses.

ISAAC A. DUNHAM.

Witnesses:
G. W. GREGORY,
N. E. C. WHITNEY.